United States Patent [19]
Current

[11] 3,727,948
[45] Apr. 17, 1973

[54] RELEASABLE WELL JOINT
[75] Inventor: James H. Current, Houston, Tex.
[73] Assignee: Camco, Incorporated, Houston, Tex.
[22] Filed: Mar. 9, 1972
[21] Appl. No.: 233,269

[52] U.S. Cl................................285/3, 85/32 V, 85/46, 85/62, 285/391
[51] Int. Cl................................................F16l 35/00
[58] Field of Search...................285/2, 3, 4, 355, 285/341, 33; 85/32 V, 46, 62

[56] References Cited
UNITED STATES PATENTS

| | | | |
|---|---|---|---|
| 2,059,175 | 10/1936 | Myrack | 285/3 X |
| 2,449,841 | 9/1948 | Claypool et al. | 285/3 X |
| 3,497,243 | 2/1970 | Grulla et al. | 285/3 |

*Primary Examiner*—Dave W. Arola
*Attorney*—James F. Weiler

[57] ABSTRACT

A releasable joint for use in a well tubing having a male and a female member and a seal therebetween in which one of the members has a connecting thread and the other member has a plurality of shear elements installed on a helix of the same lead as the connecting thread whereby the members may be rotatably engaged and disengaged as well as disengaged by shearing the elements by straight pull. In one embodiment the shear elements are threaded into holes extending through the female member whereby the shear value may be visually observed or changed without disassembling the joint. In another embodiment the shear elements may be positioned on the male member. The connecting thread may be formed of a plurality of segments which are spring loaded radially toward the other member and the thread may be of a buttress type.

7 Claims, 5 Drawing Figures

3,727,948
Fig. 2
Fig. 3
Fig. 1
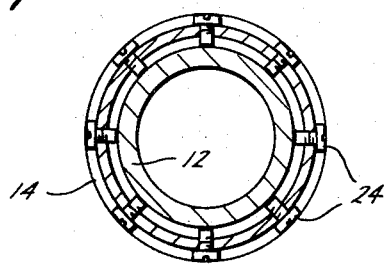
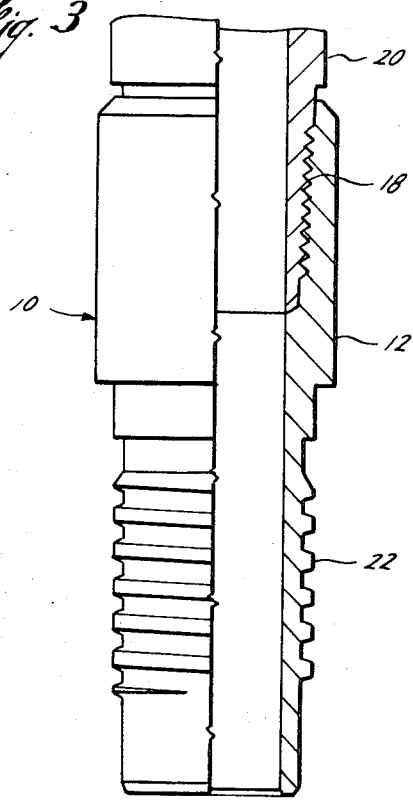
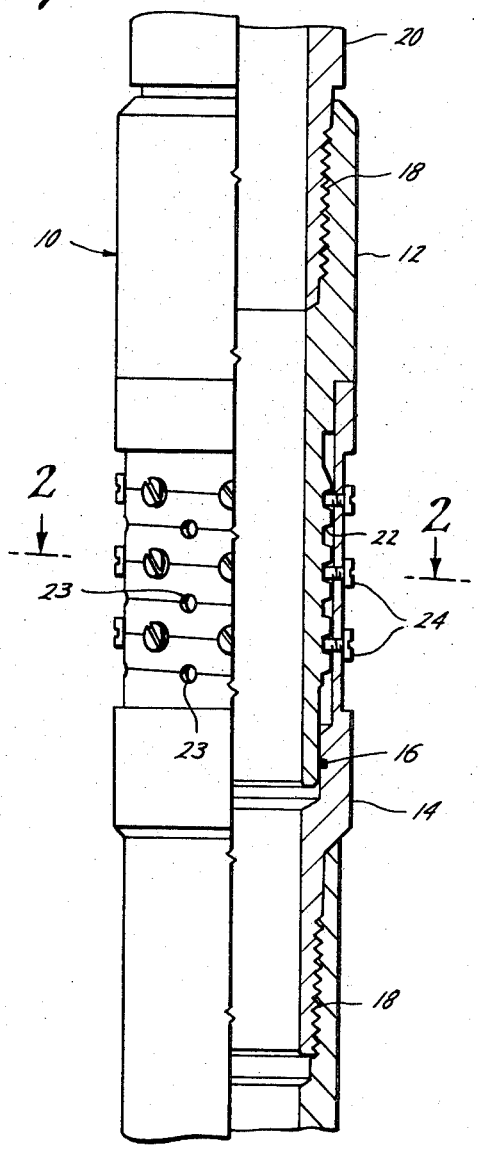
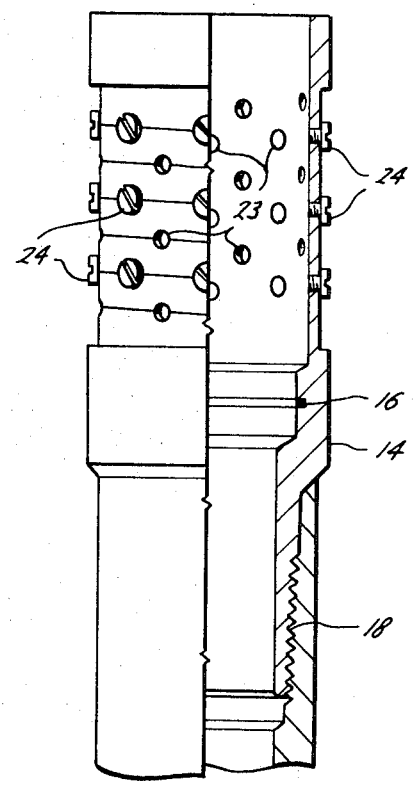

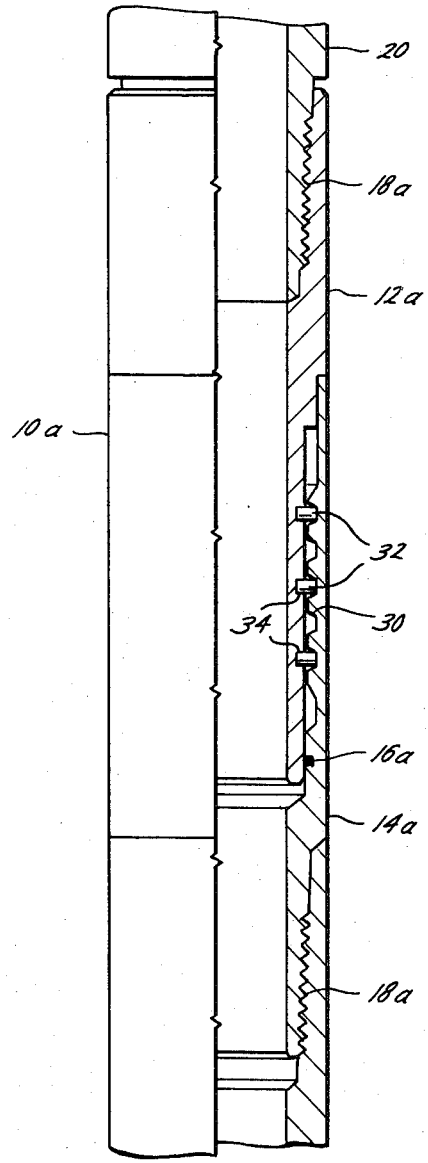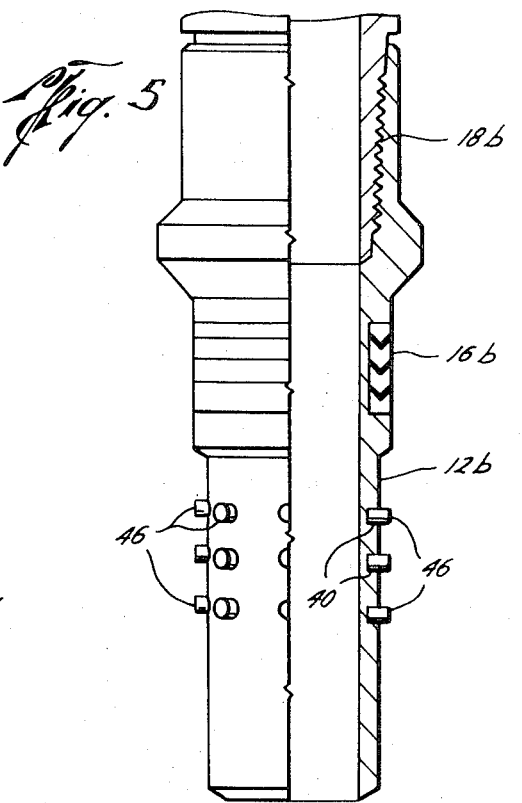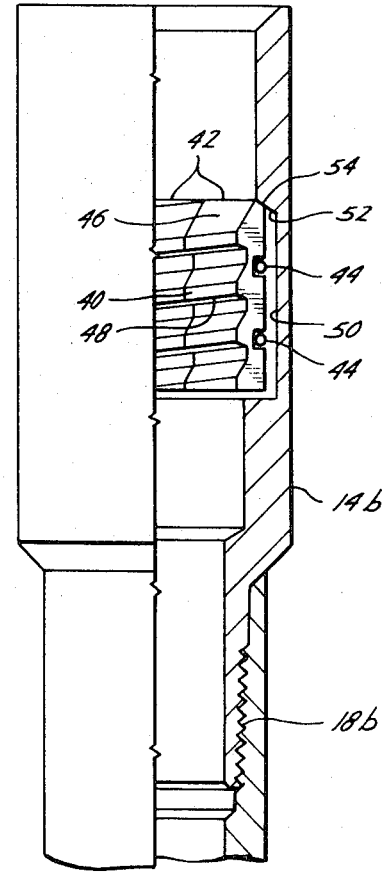

RELEASABLE WELL JOINT

BACKGROUND OF THE INVENTION

It is frequently desirable to disengage portions of a tubing string in a well bore. For example, it is desirous to have an emergency releasing means such as a safety joint in a tubing string above a packer so that the upper portion of the tubing string can be detached and removed from the well in the event that the packer does not release in a normal manner. Further, an "on-off attachment" has been used in the past to temporarily disconnect portions of a tubing string from each other such as to permit work to be done on zones above an oil well packer without disturbing the zone below the packer. Such safety joints or "on-off attachment" have been of a threaded rotatably release device, a conventional jay-slot connection which requires a combination of right-hand and left-hand torque or rotation, or by a straight pull frangibly released member.

Generally, it is more desirable to use a torque or rotation in only one direction when disengaging a tubing string due to the possibility of intervertently unscrewing the tubing or unseating a packer. It is also desirable to have an emergency release means in the event that rotation is impossible. The present invention is directed to a releasable joint for use in a well tubing which provides both advantages.

SUMMARY

The present invention is directed to a releasable joint for use in a well tubing which releases by either a straight pull or by rotation in a single direction and which also provides a means for easily adjusting the amount of the straight pull releasing force.

A still further object of the present invention is the provision of a releasable joint having a male member, a female member and a seal therebetween in which a first member includes a connecting thread for engagement with the second member and in which the second member includes a plurality of shear elements installed on a helix of the same lead as the connecting thread whereby the first and second members may be rotatably engaged and disengaged as well as disengaged by shearing the shear elements.

A still further object is a releasable joint in which the upper member is the male member and includes the shear elements so that upon disconnection of the joint fishing operations for the female member may be simplified.

Yet a further object is the provision of a releasable joint in which the lower member is the female member and the shear elements are threaded into holes extending through the female member whereby the shear value may be visually observed or changed without disassembling the releasable joint.

Yet a still further object is wherein the connecting thread on one of the members is formed by a plurality of segments which are spring loaded radially toward the other member and the thread is a buttress type having a beveled edge on a first side facing the other member and a square second side whereby the joint may be assembled or disengaged by either a longitudinal or rotational movement.

BRIEF DESCRIPTION OF THE DRAWINGS

FIG. 1 is a fragmentary elevational view, partly in cross section, illustrating one form of the present invention assembled in position in a tubing, FIG. 2 is a cross-sectional view taken along the line 2—2 of FIG. 1, FIG. 3 is an exploded fragmentary elevational view, partly in cross section, illustrating the embodiment of FIGS. 1 and 2 in a disengaged position in which the shear elements have been sheared, FIG. 4 is a fragmentary elevational view, partly in cross section, of a modified embodiment of the present invention in which the shear elements are positioned on the male member of the releasable joint and the connecting thread is positioned on the female member, and FIG. 5 is an exploded fragmentary elevational view, partly in cross section, of another embodiment of the present invention shown in the disengaged position.

DESCRIPTION OF THE PREFERRED EMBODIMENT

Referring now to the drawings, and particularly to FIGS. 1-3, the releasable joint of the present invention is generally referred to by the reference numeral 10 and generally includes a male member 12 and a female member 14 and a seal 16 therebetween to provide a fluid type joint. While either the male member 12 or the female member 14 may be the upper joint and the other the lower joint, it is normal in oil and gas industry for the upper member to be the male member. Each of the members 12 and 14 includes connecting means such as threads 18 for connecting the members 12 and 14 in a conventional well tubing 20.

One of the members 12 or 14, here shown as male member 12, includes a connecting thread 22, preferably a conventional coarse square thread, for engagement with the other member. The other member, here shown as the female member 14, includes a plurality of shear elements such as shear pins or shear screws 24 positioned on the female member 14 in a helix of the same lead as the thread 22 on the member 12. Thus, the two members 12 and 14 may be rotatably engaged and disengaged as in the case if both had common threads.

The female member 14 is made by scribing a line on the outside diameter that is a helix in exact lead with the thread 22 on the mating male member 12. This scribed helix becomes a reference line in which may be drilled and tapped a plurality of holes 23 at regular intervals. The shear elements 24 such as screws, are installed in the holes 23 and protrude into the internal diameter of the member 14. The shear elements 24 collectively form a thread internally of the female member 14 which can be mated to the threads 22 on the male member 12 by rotational movement. The total shear value of the releasable joint 10 may be adjusted downwardly from full value simply by removing some of the shear elements 24 until the desired shear value is reached. Once the releasable joint 10 is installed in a well conduit 22, the joint 10 may be either unscrewed rotationally or sheared free by a straight pull, as shown in FIG. 3, to provide disengaement. Of course, the threaded connection may be either a right-hand or left-hand thread, but it is normally preferred that the direction of unscrewing be opposite to that of the joints 20 and threads 18 to prevent inadvertently unscrewing the tubing 20 when releasing the joint 10. It is noted that the shear elements 24 may be visually observed while the joint 10 is assembled so that the shear value of the joint 10 may be calculated or changed without disassembling the joint 10.

Of course, other and further embodiments and modifications may be made, one of which is shown in FIG. 4 and another of which is shown in FIG. 5, where like parts to those shown in FIGS. 1-3 are given corresponding numbers with the addition of a suffix "a" and "b," respectively. In FIG. 4, the male member 12a and the female member 14a are adapted to be releasably engaged with each other to form a releasable joint 10a. In this embodiment the female 14a is provided with a connecting thread 30, preferably a coarse square thread, and the male member 12a is provided with a plurality of shear elements 32. The male member 12a is made by scribing a line on the outside diameter of the male member 12a that is a helix in exact lead with the thread 30 on the mating female member 14a. The scribed helix becomes a reference line into which are drilled a plurality of holes 34 at regular intervals and the shear elements 32 such as pins or screws are installed and protrude radially outward from the male member 12a to form a male thread for mating engagement with the thread 30 on the female member 14a. One advantage of the releasable joint 10a is that after the joint 10a has been released, a work string can be run back into the well with a threaded reconnecting tool having a male thread that matches the female thread 30 on the female member 14a. This feature permits fishing operations without the use of spears, overshots or other conventional fishing equipment. Also, after the joint 10a has been released, the male member 12a may have the shear elements 32 replaced with those of greater strength or install additional shear elements 32 at the surface whereby the male member 12a may be run back downhole and reconnected to the female member 14a using any desired shear force to provide a fishing operation with a safety release system.

Referring now to FIG. 5, a further embodiment of the present invention is shown and includes a first member 12b and a second member 14b. The member 12b is shown as the male member and the member 14b as being the female member. One of the members, here shown as the female member 14b, includes a connecting thread 40 which is formed by a plurality of segments 42 which are spring loaded by springs 44 radially in a direction for engagement with the other member 12b. The other member, here shown as the male member 12b, carries a plurality of shear elements 46 for mating with the thread 40 of the member 14b. The shear elements 46 are installed by scribing a helix around the outside diameter of the member 12b that is in exact lead with the thread 40 of the female member 14b. The helix becomes a reference line into which are drilled a plurality of holes at regular intervals and the shear elements 46 such as pins or screws are installed in the holes 48 and protrude outwardly from the member 12b and collectively form a thread which can be readily screwed or unscrewed from the ratchet segment 42.

The threads 40 on the ratchet segment 42 are of the buttress type, being beveled on the first surface 46 and square on the second surface 48. Thus, the members 12b and 14b may be longitudinally pushed together and the shear elements 46 will urge the spring-loaded ratchet segments 42 radially outward allowing the members to latch. The square second sides 48 of the threads 40 becomes a bearing surface for the shear elements 46. Thus, the members 12b and 14b may be engaged by rotation or by simply pushing the members together. The members 12b and 14b may be disengaged by rotating the member 12b in a predetermined direction. In the event that rotation is impossible, a straight pull of a predetermined force shears all of the shear elements 46 permitting disengagement. The required shear force may be adjusted downwardly from the full force to any desired force by simply removing some of the shear elements 46 until the desired shear value is obtained. And similar to the embodiments shown in FIGS. 1-4, the releasable joint of FIG. 5 may be disengaged in a well, the member 12b removed, and the shear elements 46 may be adjusted to any desired value and reun into the well and engaged with the member 14b thereby permitting changing the shear value of the releasable joint after the tubing and releasable joint have been run into the well bore.

Additionally, the member 14b may include a recess 50 for supporting the ratchet segments 42 and the top 52 of the recess 50 may be tapered inwardly to coact with a tapered surface 54 on the tops of the segments 42. The tapered surfaces 52 and 54 insure that the segments 42 are wedged inwardly against the shear elements 46 to prevent any accidental release of the joint.

The present invention, therefore, is well adapted to carry out the objects and attain the ends and advantages mentioned as well as other inherent therein. While presently preferred embodiments of the invention are given for the purpose of disclosure, numerous changes in the detail of construction and arrangement of parts will readily suggest themselves to those skilled in the art and are encompassed within the spirit of the invention and the scope of the appended claims.

What is claimed is:

1. A releasable joint for use in a well tubing having a male member, a female member and a seal therebetween, the improvement comprising, only one of said members including a connecting thread for engagement with the other member, the other of said members including a plurality of shear elements installed thereon in a helix of the same lead as the connecting thread whereby the members may be rotatably engaged and disengaged as well as disengaged by axial movement hy shearing said elements.

2. The apparatus of claim 1 wherein the connecting thread is a coarse square thread.

3. The apparatus of claim 1 wherein the lower member is the female member and the shear elements are threaded into the holes extending through the female member whereby the shear value may be visually observed or changed without disassembling the joint.

4. The apparatus of claim 1 wherein the upper member is a male member and includes the shear elements.

5. The apparatus of claim 1 wherein the connecting thread is formed by a plurality of segments which are spring loaded radially toward the other member and said thread is a buttress type having a beveled edge on the first side facing the other member and a square second side.

6. The apparatus of claim 5 wherein the one member includes a recess carrying said plurality of segments and coacting surfaces are provided on the segments and the edge of the recess on the side adjacent the other member.

7. The apparatus of claim 1 wherein the connecting thread is on the female member which is positioned below the upper male member and the connecting thread is formed of a plurality of segments which are spring loaded radially inwardly, said thread being of a buttress type having a beveled edge on the top sides of the thread and a square lower second side.

* * * * *